Patented Apr. 18, 1944

2,346,753

UNITED STATES PATENT OFFICE 2,346,753

PROCESS FOR THE PREPARATION OF CARDIAC GLUCOSIDE

Max Hartmann, Riehen, and Emil Schlittler, Basel, Switzerland, assignors to Ciba Pharmaceutical Products, Incorporated, Summit, N. J., a corporation of New Jersey No Drawing. Application January 10, 1941, Serial No. 374,020. In Switzerland March 1, 1940

2 Claims. (Cl. 260—210)

Crystallized glucosides have been obtained up to the present mostly from Strophanthus, Digitalis, Oleander, Convallaria or Scilla. The genus Adenium has been only little used for the preparation of cardiac glucosides. This is obviously due to the fact that only in one single case a crystalline glucoside could be obtained. Perrot and Leprince have isolated from *Adenium hongkel* (Comptes rendus 1909, vol. 149, page 1393) an amorphous substance to which they ascribed the properties of a cardiac glucoside but which they were unable to purify further. Krause (Berl. Klin. Wochenschrift, vol. 47, page 1699, [1910]) describes a crude amorphous product with cardiac action extracted from *Adenium coetaneum*, which nevertheless is a tarry, resinous substance. Boehm (A. Pth., vol. 26, page 165, [1890]) was successful in preparing a crystalline substance from *Adenium boehmianum* Schinz which he named "echujin." In the paper cited the properties of echujin are described in detail. It is shown to be a substance which is readily soluble in water but completely insoluble in chloroform, having a melting point of 120-185° C. On acid hydrolysis, echujin yields an aglucone, echujetin, and glucose.

It has now been found that a cardiac glucoside is obtained if *Adenium somalense* Balf. fil. is used as parent material. The process used in preparing the new cardiac glucoside, to which the name of "Somalin" has been given (Helvetica Chimica Acta, vol. 23, page 548 [1940]), consists in methods of working, themselves known, which are in use for the preparation of cardiac glucosides. Preferably, the dried roots of *Adenium somalense* are exhausted with aqueous methyl alcohol, the alcohol is removed and impurities are separated from the aqueous concentrate obtained by means of aqueous lead salts. The aqueous, preferably saturated, solution is now extracted with chloroform, and the chloroform solution is then washed with aqueous methyl alcohol and then evaporated to dryness. By recrystallization of the residue from ethanol the glucoside is obtained. It has a melting point of 195-197° C. and an optical rotation of $[\alpha]^{19}_D = +9.5°$. The empirical molecular formula is $C_{30}H_{46}O_7$ and its constitution is that of a cymarose either of digitoxigenin.

In contrast to echujin, the glucoside possesses only slight solubility in water but a much higher solubility in chloroform. It crystallizes from methyl alcohol in needles or plates of M. P. 195-198° C. and from ethyl acetate-absolute ether in plates of the same melting point. The Légal reaction is positive, the Keller-Kiliani reaction shows a brown ring in concentrated sulphuric acid and a magnificent blue coloration of the glacial acetic acid. The genine is not combined with glucose, as in the case of echujin, but with adeoxy sugar, viz., cymarose. By cautious acid hydrolysis the cardiac glucoside is split into cymarose and digitoxigenin. From the pharmacological point of view it differs appreciably from the cardiac glucosides hitherto known. It is about 10 times less toxic than ouabain although the systolic arrest of the frog's heart results from the same dosage as in the case of ouabain.

The glucoside will find therapeutic application.

Example 4.38 kg. of dried *Adenium somalense* root are percolated to exhaustion with methyl alcohol of about 70 percent strength, and the extract is largely freed from methyl alcohol by vacuum distillation. To the aqueous concentrate a basic lead acetate solution is added until no further precipitate is formed. After removal of the precipitation by centrifuging, the excess of lead salt is precipitated by cautious addition of disodium phosphate. After removal of the lead phosphate formed by centrifuging, the slightly yellow colored aqueous solution of the glucosides is concentrated in vacuo, after which ammonium sulphate is added. The aqueous solution is now extracted with chloroform, and the chloroform solution is washed with aqueous methyl alcohol (1:5). On evaporation, the aqueous solution yields 2.3 gms. of a brown, oily residue, having strong glucoside reactions. On evaporation of the chloroform solution in vacuo, 26 gms. of a light yellow substance remains; it has strong glucoside reactions and cardiac activity. 2 gms. of this crude product are dissolved in absolute ethyl alcohol and filtered; water is then added with extreme caution until turbidity just persists, and the flask is left standing in the dark for some days to crystallize. The glucoside crystallizes after a short time in magnificent plates. These are best recrystallized from absolute methyl alcohol, from concentrated solutions the glucoside separates in felted needles from more dilute solutions in plates. The melting point is 195-197° C., after temporary softening and escape of crystal solvent at 133-135°.

What we claim is:

1. Process for the manufacture of a new crystalline cardiac glucoside by separating impurities by means of soluble lead salts from an aqueous extract of *Adenium somalense*, extracting the aqueous, preferably saturated, solution with chloroform, washing the chloroform layer with aqueous alcohol, evaporating the washed chloroform layer and recrystallizing the residue from alcohol.

2. A process for the preparation in crystalline form of the cardiac glucoside having the empirical formula $C_{30}H_{46}O_7$, the constitution of a cymarose ether of digitoxigenin and the melting point 195–197° C., which comprises separating impurities by means of a soluble lead salt from an aqueous extract of *Adenium somalense*, extracting the purified aqueous solution with chloroform, washing the chloroform layer with aqueous alcohol, and crystallizing the said glucoside from the washed chloroform layer.

MAX HARTMANN.
EMIL SCHLITTLER.